Jan. 18, 1955 P. R. ARONSON 2,699,596
PROCESS OF MAKING GAS PRESSURE CYLINDERS HAVING
WALLS WITH IMPROVED UNIFORMITY IN THICKNESS
Filed June 9, 1948

INVENTOR
PETER R. ARONSON
BY
ATTORNEY

United States Patent Office

2,699,596
Patented Jan. 18, 1955

2,699,596

PROCESS OF MAKING GAS PRESSURE CYLINDERS HAVING WALLS WITH IMPROVED UNIFORMITY IN THICKNESS

Peter R. Aronson, Pelham, N. Y., assignor, by mesne assignments, to Union Carbide and Carbon Corporation, a corporation of New York Application June 9, 1948, Serial No. 32,004

4 Claims. (Cl. 29—540)

Heretofore cylinders for transporting gas under high pressure have been made in perhaps three different ways. One is to hot cup and draw a cylinder from a plate. A second is to hot press a short billet into cup shape followed by hot drawing. A third process started with a hot rolled or drawn tube and closed one end of the tube by hot spinning to close an end and thicken it. A central fissure in such case usually needed welding and in any event such method is open to the objection of having dross and oxide inclusions in the bottom portion. In each of these three processes the generally hemispherical closed bottom is of greater thickness than the sides and is pressed into form a bottom on which the cylinder could stand upright.

All three of these processes have been objectionable by producing cylinder walls of thickness which varies as much as plus or minus about 12½ percent. This variation in thickness is believed to have many causes. For example, the temperature and metallurgical texture of the metal may not be precisely uniform but may cause one portion of the walls to attenuate more easily than another in being formed while hot. The tools used in hot cupping or drawing may possess a slight degree of yieldability as well as slight lost motion in their mounting and movement. All such factors may be among those causing the cylinder walls when formed by hot working to have this objectionable non-uniformity.

Such non-uniformity in thickness of the cylinder walls has meant excess metal in the finished cylinders. Excess metal is thus wasteful and an expense in manufacture. It is also a continuing expense as freight rates for shipment of these cylinders depend on weight.

Ways of eliminating this excess metal in these high pressure gas cylinders have long been sought but without success. All the hot working processes have the aforementioned non-uniformity inherent in the finished product. Cold working processes for cupping and drawing have long been known to provide a product of greater uniformity in wall thickness. A reason why cold working has not been employed for a standard size cylinder of about 9 inches in diameter and 51 inches in length, is the practical impossibility of cold cupping and drawing a sheet of metal as thick as the ¾ inch needed in the base. To cold cup and draw a cylinder from a plate ¾ inch thick would require prohibitive power requirements, time and expense. Although the side walls of such a standard cylinder are only about ¼ inch thick the base must be nearly three times that thickness.

It has been customary to avoid welding any portion of cylinders in which gases such as oxygen or nitrogen or argon are transported under a pressure of a couple of thousand pounds per square inch or more. The reason is because any weld may be structurally unsafe at these high pressures and yet appear satisfactory on the outside. This is due to a lower factor of safety used in shipping containers and the commercial impracticability of X-ray examination in quantity production. Not only has the cylinder proper not been welded but welding is not permissible in connection with securing a foot ring to such a cylinder. The foot ring is the base or support enabling the cylinder to stand upright. For this reason it has been customary to bow or bend inward the generally hemispherically thick bottom of such a cylinder to constitute a base on which the cylinder may rest with its axis erect. In order to provide sufficient strength to withstand reversal from the high gas pressure against the inward convex bottom, as well as to give an added factor of safety against corrosion from contact with various types of ground and also due to the possibility of abrasion or wear from the ground it has been customary to make the portion of the cylinder in contact with the ground about three times as thick as are the longitudinal walls of the cylinder.

An object of this invention is to provide a process for producing a cylinder for high pressure gas which has its walls of more nearly uniform thickness than has heretofore been commercially feasible, especially in cylinders of about standard size. Another object is to provide such a cylinder which is more economical for shipment. A further object is to provide a process for producing such a cylinder with a thickened bottom and having the aforementioned advantages which at the same time is free from any plug or weld and oxide inclusions as well as being free from radial cracks or striations on the inside of the bottom. Yet a further object is to provide a process for producing such a gas pressure cylinder having walls which are uniform enough in thickness to warrant the use of a more expensive and stronger alloy.

According to this invention it has been discovered that a cylinder having greater uniformity in wall thickness could be made by cold cupping and drawing from a plate of about the thickness desired in its side walls and later thickened at the bottom without substantially thinning these side walls. It has been found that a hot working process could be used for thickening the base of a cold cupped and cold drawn cylinder having an already closed and rounded bottom without detracting from the wall uniformity and without injecting into the bottom of the cylinder those weaknesses which have heretofore characterized hot spun and thickened bottom portions as they have been formed in closing the end of a tube.

Thickening an already closed bottom of a cylinder does not require a plug or welding and there are no oxide inclusions in such a thickened bottom as occur in the third of the aforementioned processes.

Figure 1:
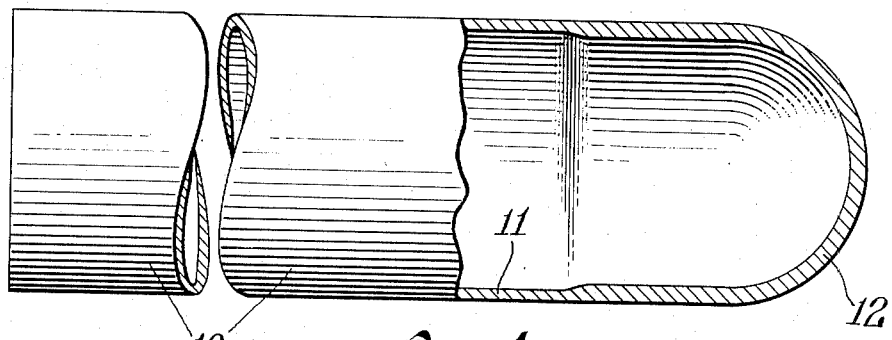
Fig. 1 shows a longitudinal view partly in section of a partially completed cylinder which has been cold cupped and cold drawn according to the preliminary steps of the present invention.

A cylinder 10 is formed by cold cupping and cold drawing a plate of about 5/16 inch thick when its side walls 11 are intended to have a thickness of .20 to .25 inch. The base portion 12 and about five inches up the side walls of the cylinder from the base are shown as being approximately the thickness of the plate from which the cylinder was formed. The step or shoulder between the portions 11 and 12 shown in Fig. 1 is formed by having the plunger used in the cold drawing operation shaped to the configuration desired for the inside of the cylinder. The operations of cold cupping and cold drawing are well known to those skilled in this art so that no detailed explanation of them is believed necessary. In one size of the standard cylinder the diameter of the cylinder is about 9 inches and the length about 51 inches in the finished product. The cylinder shown in Fig. 1 will need to be approximately 56 inches long before it has been shortened by the succeeding operations hereinafter described.

Figure 2:
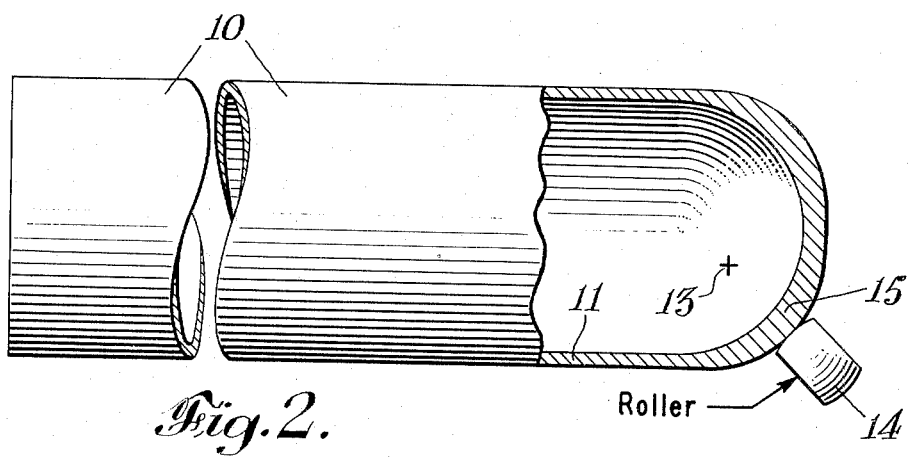
Fig. 2 shows the cylinder of Fig. 1 after the bottom has been thickened with the aid of a spinning tool.
Figure 3:
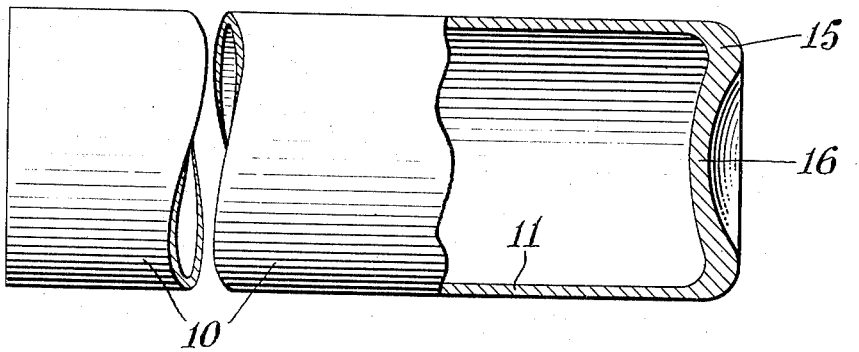
Fig. 3 illustrates the cylinder of Figs. 1 and 2 of this invention after the bottom portion of Fig. 2 has been pressed inwardly to form a base upon which the cylinder may stand.

To provide a base of a thickness of about ¾ inch the cylinder of Fig. 1 is heated to an appropriate temperature for hot flowing and shortening the side walls by spinning metal from the walls into the bottom as shown in Fig. 2 of the drawing. For this purpose a conventional spinning tool 14 is provided having movement in an arc of a circle about a center 13 with a radius shorter than that about which the base of Fig. 1 is formed. The arcuate movement of the spinning roller 14 is about a center 13 offset from the cylinder axis by perhaps 1 to 2 inches. It has been found that the spinning roller 14 may hot flow metal from the sides into the base by shortening the cylinder without thinning its walls. This operation, as shown in Fig. 2, may be defined perhaps more accurately as hot spin-forging, since the flow of metal from the side walls adjacent the bottom into the bottom wall as the cylinder is shortened under the influence of the spinning tool, is possibly more analogous to forging than a conventional spinning operation. The cylinder base is heated to a desired temperature in a preheating furnace and maintained at this temperature during spinning by means of a flame type heating head mounted in the spinning machine. The cylinder 10 is rotated and the spinning tool moved at first through a short distance and then through an amplitude of swing which gradually increases. The metal is flowed ahead of the spinning tool so that the center of the base of the cylinder may be thickened without the necessity for the tool 14 moving all the way to the axial center thereof. While the entire base has been thickened as illustrated the center portion of the base need not be thickened as much as the portion 15 which is in contact with the ground after the outwardly bulging base has been pressed inwardly as shown at 16 in Fig. 3. It will be noted the base is of maximum thickness at approximately the places where the maximum bending moment occurs under internal pressure tending to cause the base to bulge outwardly.

The product of this process differs from the product made by each of the prior art processes referred to above in the following particulars. The walls are of much more nearly uniform thickness being within about plus or minus 2 to 2½ percent of uniformity whereas the walls of the cylinders made by any of the three aforementioned hot working processes have been found to have a greater variation in wall thickness which is as much as plus or minus 12½ percent of being uniform. The finished cylinder made by the present invention has a base which is distinguished from the base of a cylinder made by either of the first two aforementioned prior art processes by the presence of flow lines visible in the base after a cross section has been etched. The product of this process differs from the product made by the third of the aforementioned processes in that the base is stronger and does not possess a central plug nor a weld nor oxide inclusions. Another difference between the product of the third mentioned prior art processes and that of the present process is that no comparable striations are formed on the inner walls of the cylinder. In that third of the aforementioned prior art processes these striations in the cylinder walls on the inside are still present after the bottom has been closed and thickened. They appear as radially directed score marks or even cracks on the inside of the bottom of cylinders made by that process thus producing regions of local stress concentration and weakening the bottom.

The standard cylinder of 9 inches in diameter and 51 inches in length has weighed about 132 pounds of which as much as 23 pounds may be due to the excess metal required from the inability to have the cylinder walls uniform. Under the present invention excess metal necessary has been reduced from 23 pounds to a probable maximum of 8 pounds thereby effecting a saving of 15 pounds of metal in the manufacture of the cylinder. At ten cents a pound such saving in metal alone is $1.50 per cylinder. A still greater saving is possible from the reduced freight charges in transporting these cylinders.

Because the cylinder walls in this invention are more nearly uniform it has been found feasible to employ a stronger alloy in the manufacture of the cylinder and a cylinder of 2 inches larger diameter having a wall thickness of only .20 inch is contemplated with increased capacity of approximately 50 percent more gas for a cylinder of the same length and weight. This invention is applicable to cylinders which are intended to stand erect without the assistance of foot rings. A metal contemplated for a new and stronger cylinder of said larger diameter contains .35 to .45 carbon, .5 to .8 manganese, .5 to .8 chromium, 1.5 to 2.0 nickel, .2 to .3 molybdenum and the balance iron. Another appropriate alloy for the larger and stronger cylinder is .25 to .35 carbon, .4 to .6 manganese, .8 to 1.1 chromium, .15 to .25 molybdenum and the balance iron.

By the term cylinder for for gas under high pressure is meant those cylinders intended to meet the requirements of the Interstate Commerce Commission Regulations, Bureau of Explosives, Shipping Container Specifications 3A and 3AA.

The process of this invention has been said to involve "spinning" because of the flow of metal from the sides of the cylinder into the base. However, the drawing shows little bending and little change in shape. There is some change in shape due to thickening and some bending due to the fact that the length of the cylinder walls is shortened, so that, if the main body of the cylinder walls be fixed against longitudinal movement during rotation, the shortening of the cylinder walls may be considered to cause the base to move toward the opposite end of the cylinder as the base is thickened. Conspicuous differences between the so-called "third process" referred to in the first paragraph of this specification and the herein invention include:

(a) In that prior process the thickening is due principally to a cantilever type bending accompanied by a thickening due to the smaller diameter a given bulk of metal at an end of the open cylinder must occupy. In the present process there is a flow of metal from the side walls to thicken the base, whereas, in that prior process, there is little such flowing of metal.

(b) If a thin sheet of paper or any thin material is rolled into cylindrical form and compressed at one end to a smaller diameter, there will be inevitable folds or creases extending radially between the portions of different diameters. In the said "third process" that tendency to form folds or creases exists in metal of almost any practical thickness for gas pressure cylinders having an end bent inwardly to thicken and close the end, and that tendency to form radial folds is what causes the striations referred to in a preceding paragraph. In the product of the present invention there are no comparable radial lines, as mentioned in that foregoing paragraph.

(c) This invention eliminates the centrally located plug, oxide inclusions, or a weld, and their inherent weaknesses that were present in the aforementioned "third process."

The product of this invention is a cylinder for high pressure gas which is light in weight, strong, and inexpensive to produce. It has side walls which are within plus or minus 2% to 12% of uniformity, or better yet, such side walls may be defined as being within plus or minus 2% to 10% of uniformity. The saving in weight in this cylinder enables a stronger and more expensive alloy to be economically feasible. This cylinder has no central plug nor any weld nor any oxide inclusions in the base. The chief use for the cylinder of this invention is in the larger size cylinders, i. e. those at least 7" in diameter. It combines for the first time the advantages of cold formed side walls with a heat formed base free of a weld or plug.

I claim:

1. The process of forming a cylinder of the type in which gas is retained under pressure and the side walls of the cylinders are between plus or minus 2 percent to 10 percent of being uniform in thickness with the bottom curved outwardly and thicker than the cylinder walls, free of oxide inclusions and a weld, said process comprising cold cupping and cold drawing a metal plate of much less thickness than the bottom in the finished cylinder to form a cylinder with one end closed and outwardly rounded, thickening the closed end by hot spinning metal from the sides into it to flow metal from the side walls by shortening their length without substantially thinning them, without welding or reducing the diameter of any of the cylinder side wall portions, and pressing inwardly the outwardly rounded closed end to form a bottom.

2. A process of forming cylinders for high pressure gas enabling larger sizes of cylinders having a base whose maximum thickness is substantially greater than the thickness of the side walls to possess a greater approach to uniformity in thickness of their side walls than has heretofore been possible without the expenditure of large power and costly apparatus in their formation, said process comprising cold cupping and drawing a cylinder having an outwardly arched base at least at one stage in its formation from a metal plate of a thickness adjacent that of the cold drawn side walls of the finished product, whereby the side wall thickness may be made more nearly uniform without having the plate from which formed initially of the thickness at least about that desired in the base of the finished product, heating said outwardly arched base of the formed cylinder to a temperature adequate to facilitate flowing metal into the base, effecting relative rotation between said cylinder and a spinning tool, hot flowing by spinning metal from the side walls adjacent said base into the base until the base is of a desired thickness substantially greater than the wall thickness, and moving the curved base with respect to and toward an opposite end of the cylinder as metal is flowed from the side walls into such base, the flowing of metal from the side walls being guided by the base as a preformed closed arch, whereby the process does not require as large an expenditure of power in the cold cupping and drawing as would be necessary were the plate from which the cylinder is formed initially of approximately the maximum ultimate thickness of the metal desired in the base.

3. A process according to claim 2 in which the flowing of metal from the side walls in the base occurs principally when said spinning tool is moved relative to the cylinder from approximately the intersection of the side walls and curved base in a curved path having a center within the cylinder and having a radius substantially less than that of the base before its thickening began but yet a radius large enough not to change the outside appearance of the base radically except in flattening the base by not moving said tool to thicken the center of the base the maximum amount.

4. The process of forming a high pressure gas cylinder having side walls of substantially uniform thickness and a closed solid end of a thickness substantially greater than that of the side walls and free of any plug or weld and oxide inclusions, which comprises cold cupping and cold drawing a metal blank into cylindrical form with side walls of substantially uniform thickness and with a solid closed rounded end free of any plug or weld and oxide inclusions but of less thickness than desired in the finished cylinder, hot spin-forging the closed end of the cylinder and the side walls adjacent the closed end to move the closed end in a direction to shorten the cylinder and to flow metal from the side walls adjacent said closed end into that closed end to thicken the same without thinning the remaining side walls.

References Cited in the file of this patent

UNITED STATES PATENTS

| | | |
|---|---|---|
| 159,883 | Bayliss | Feb. 16, 1875 |
| 440,951 | Knapp | Nov. 18, 1890 |
| 529,597 | Cayley | Nov. 20, 1894 |
| 1,420,721 | McNiff | June 27, 1922 |
| 1,864,475 | Rudd | June 21, 1932 |
| 1,948,437 | Bowers | Feb. 20, 1934 |
| 2,016,227 | Clausen | Oct. 1, 1935 |
| 2,026,133 | Mapes | Dec. 31, 1935 |
| 2,028,996 | Sautier | Jan. 28, 1936 |
| 2,079,769 | McAbee | May 11, 1937 |
| 2,140,775 | Talbot-Crosbie et al. | Dec. 20, 1938 |
| 2,284,210 | Johnson | May 26, 1942 |
| 2,292,669 | Sinclair et al. | Aug. 11, 1942 |
| 2,313,474 | Hill | Mar. 9, 1943 |
| 2,349,970 | Lambeek | May 30, 1944 |
| 2,406,059 | Burch | Aug. 20, 1946 |
| 2,408,596 | Bednar et al. | Oct. 1, 1946 |

FOREIGN PATENTS

| | | |
|---|---|---|
| 432,718 | Great Britain | Aug. 1, 1935 |
| 438,183 | Great Britain | Nov. 12, 1935 |